July 13, 1937.　　　O. J. MOUSSETTE, SR　　　2,086,875
BEARING FOR ROTARY CRUSHERS
Filed Aug. 26, 1936　　　2 Sheets-Sheet 2
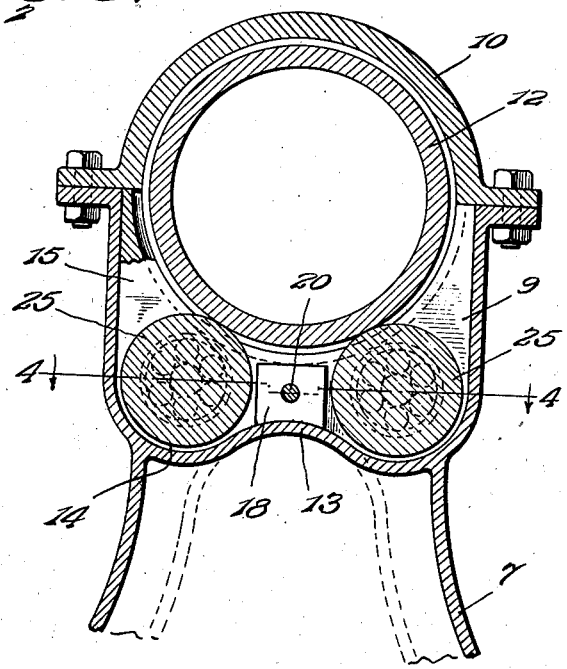
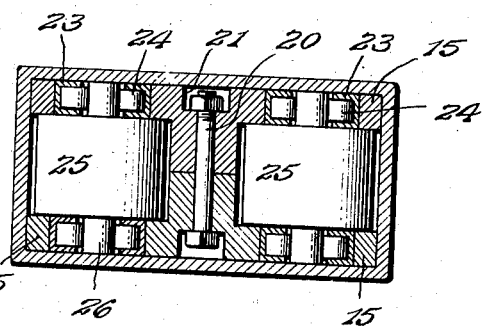

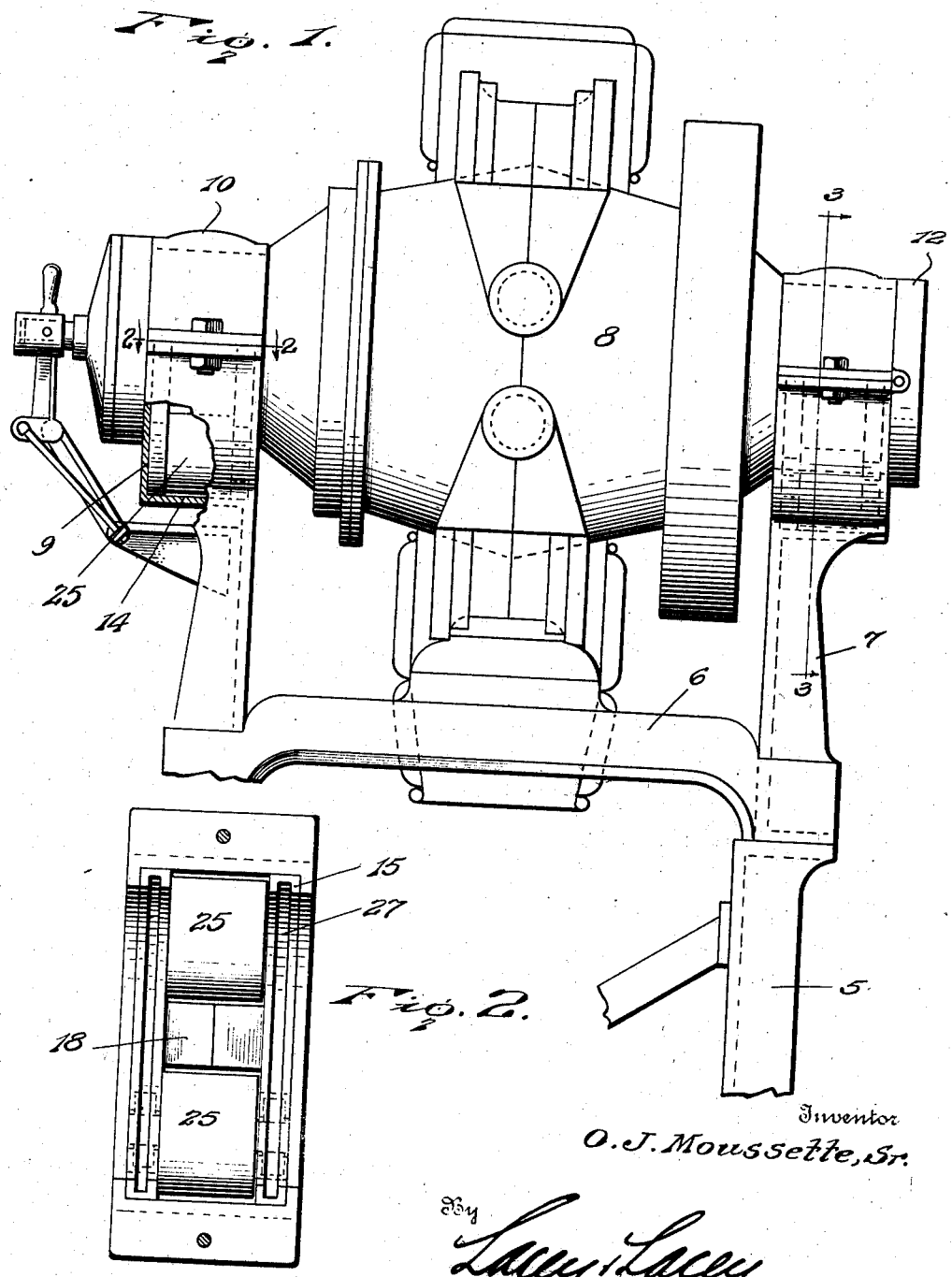

Patented July 13, 1937

2,086,875

UNITED STATES PATENT OFFICE 2,086,875

BEARING FOR ROTARY CRUSHERS

Oliver J. Moussette, Sr., Queens Village, N. Y.

Application August 26, 1936, Serial No. 98,009

5 Claims. (Cl. 308—203)

This invention relates to roller bearings and more particularly to a bearing especially designed for use on rotary crushing drums of the type shown and described in my co-pending application filed in the United States Patent Office on the 22nd day of July, 1935, under Serial No. 32,676.

The object of the invention is to provide a roller bearing of simple and inexpensive construction adapted to take the place of Babbit metal bearings at the opposite ends of a revolving crusher drum and which will permit rotation of the drum with minimum friction and power consumption.

A further object of the invention is to provide a roller bearing comprising mating sections having idle drum supporting rollers mounted thereon and provided with anti-friction balls or rollers surrounding the journals of the idle rollers, said sections being detachably united and insertable as a unit within receiving seats formed in the upper ends of the drum supporting standards of the crusher.

A still further object of the invention is generally to improve this class of devices so as to increase their utility, durability and efficiency.

Further objects and advantages of the invention will appear in the following description, in which Figure 1 is a side elevation of a rotary crusher provided with end bearings constructed in accordance with the present invention, Figure 2 is a transverse sectional view taken on the line 2—2 of Figure 1, Figure 3 is a vertical sectional view taken on the line 3—3 of Figure 1, Figure 4 is a horizontal sectional view taken on the line 4—4 of Figure 3, and Figure 5 is a perspective view of one of the bearing plates detached.

Similar numerals of reference indicate corresponding parts in all the figures of the drawings.

The improved roller bearing forming the subject-matter of the present invention is principally designed for supporting the opposite ends of rotary crushing drums and by way of illustration is shown in connection with a rotary crushing machine of the type illustrated in my co-pending application previously referred to. The crusher comprises a foundation frame 5 on which is mounted a superstructure 6 including spaced uprights or standards 7 between which is mounted for rotation a rotary drum, indicated at 8. The upper ends of the standards 7 are provided with seats or recesses 9 normally closed by removable cap pieces 10 whereby to permit access to the hollow journal 12 of the revolving drum 8. The lower or bottom wall of each standard at the adjacent recess 9 is curved upwardly to form an intermediate concave portion 13 defining spaced pockets 14 for the purpose hereinafter referred to.

By reference to Figure 1 of the drawings, it will be seen that each standard is provided at its upper end with a receiving seat 9 for a bearing whereby to support the journal 12. Each bearing comprises mating sections or plates 15 having their lower surfaces curved at 16 to conform to the curvature of the bottom of the receiving seats 9 and their upper portions concave at 17 to accommodate the adjacent journal 12. The plates 15 are preferably flat and extending laterally from the lower portion of each plate at the concave portion 13 thereof is a boss or lug 18 adapted to register with a similar boss on a mating plate or section when said sections are united. The bosses 18 are provided with alined openings 19 adapted to receive a bolt or similar fastening device 20 for holding the sections securely in assembled position. The outer faces of the plates 15 are formed with seats 21 adapted to receive the head and securing nut of the adjacent bolt 20, as best shown in Figure 4 of the drawings. Formed in each bearing section or plate 15 and disposed on opposite sides of the adjacent boss or lug 18 are circular openings 22 adapted to receive retaining rings 23 carrying a series of anti-friction balls or rollers 24. Mounted for rotation between the bearing plates or sections 15 are idle rollers 25 having stub shafts 26 against which the balls or rollers 23 bear for the purpose of reducing friction between the parts. The roller retaining rings 23 are preferably pressed within the openings 22 so as to prevent accidental displacement thereof when assembling the bearing plates preparatory to inserting the bearings within the receiving seats 9 of the standards. The upper concave face of each bearing plate or section 15 is preferably formed with a shallow concave groove 27 adapted to receive lubricating oil or a strip of absorbent material saturated with oil for the purpose of keeping the parts well lubricated.

In assembling the bearing, the roller-retaining rings 23 are pressed within the openings 22, after which one of the stub shafts of each idle roller 25 is inserted between the rollers 24 of one of the bearing plates. The mating bearing plate or section 15 is then fitted over the other ends of the stub shafts 26 and the bearing plates pressed inwardly until the bosses or lugs 18 contact with each other, after which the bolt 20 is passed through the openings 19 and the clamping nut adjusted, thereby holding the different parts comprising the bearing in assembled position. With the parts thus assembled, each bearing as a unit may be inserted in a receiving seat 9 from the top of the standard and in which position the bearing plates or sections will rest on the bottom of the receiving seats 9 and support the idle rollers in position to permit free rotation thereof. By reference to Figure 3 of the drawings, it will be noted that the idle rollers 25 bear against and support the journal 12 of the rotary drum and, inasmuch as the idle rollers are mounted in ball or roller bearings, friction between the parts is reduced to a minimum and power consumption is likewise materially reduced. The parts are kept well lubricated by the supply of oil within the groove 27, a portion of the oil within the groove being taken up by the journal and uniformly distributed thereover so as to render the bearing practically noiseless and dispense with Babbitt metal usually employed for this purpose.

It will here be noted that the pockets 14 accommodate the idle rollers 25 and the central concave portion 13 of the receiving seats 9 serves to assist in preventing lateral movement of the bearings within said seats.

While the bearing is principally designed for the journals of rotary crushing drums of the type referred to, it will, of course, be understood that said bearings may be used with equally good results on any other type of rotary crusher or wherever a bearing of this character is found desirable or necessary.

Having thus described the invention, what is claimed as new is:

1. A device of the class described comprising a standard having a seat opening through the upper end thereof and having its bottom provided with spaced pockets, a journal mounted for rotation in the standard at its seat, a bearing detachably fitted in the seat and formed of mating sections having their upper portions concave and their lower portions formed with registering openings, a lug projecting inwardly from each section between the adjacent openings thereof, a bolt extending through said lugs, retaining rings fitted in the openings and provided with bearing members, and idle rollers interposed between said sections at said pockets and provided with stub shafts engaging the bearing members, said idle rollers contacting with and serving to support the journal.

2. A device of the class described comprising spaced standards each having a seat opening through the upper end thereof, a journal mounted for rotation on the standards at said seats, bearings fitted in the seats and each comprising companion plates having their upper portions concave to accommodate the journal and provided with a lubricating groove and their lower portions formed with openings, a lug extending inwardly from each plate between the adjacent openings, a fastening device extending through the lugs, retaining rings fitted in the openings and provided with bearing members, and idle rollers interposed between the plates of each bearing and provided with stub shafts engaging the bearings of the adjacent retaining rings.

3. A bearing comprising coacting companion plates each having its upper portion concave and its lower portion provided with spaced substantially circular openings, a perforated lug extending inwardly from each plate and adapted to register with the perforated lug of a mating plate, bolts extending through the lugs of said plates for securing them together, retaining rings fitted in said openings and provided with bearing members, and idle rollers journaled between the plates and provided with stub shafts engaging said bearing members.

4. A bearing comprising coacting vertically disposed plates each having its upper portion concave and provided with a lubricating groove and its lower portion curved upwardly at the center thereof, a lug projecting inwardly from each plate at the upwardly curved portion thereof and adapted to register with the lug of a mating plate, there being openings formed in each plate on opposite sides of the lug, a fastening device extending through the registering lugs, retaining rings fitted in the openings provided with bearing members, and idle rollers mounted for rotation between the plates and provided with stub shafts engaging said bearing members.

5. In a crusher, the combination with spaced standards having seats opening through the upper ends thereof, of a drum mounted for rotation between the standards and provided with end journals rotating in said seats, bearings detachably mounted in the seats and each formed of mating sections having their upper portions concave to accommodate the end journals and their lower portions provided with spaced openings, a lug projecting inwardly from each section, bolts connecting the lugs, the bottom wall of the recess of each standard being curved upwardly and defining spaced pockets, bearing-carrying rings fitted in the openings, and idle rollers mounted for rotation between adjacent sections at said pockets and provided with stub shafts fitting between and engaging the bearing-carrying rings.

OLIVER J. MOUSSETTE, Sr.